(12) United States Patent
Matsuba

(10) Patent No.: US 8,240,229 B2
(45) Date of Patent: Aug. 14, 2012

(54) SHIFT LEVER DEVICE

(75) Inventor: Daisuke Matsuba, Aichi-ken (JP)

(73) Assignee: Kabushiki Kaisha Tokai-Rika-Denki-Seisakusho, Aichi-Ken (JP)

( * ) Notice: Subject to any disclaimer, the term of this patent is extended or adjusted under 35 U.S.C. 154(b) by 211 days.

(21) Appl. No.: 12/784,860

(22) Filed: May 21, 2010

(65) Prior Publication Data

US 2010/0300231 A1    Dec. 2, 2010

(30) Foreign Application Priority Data

May 26, 2009  (JP) .................................. 2009-126601

(51) Int. Cl.
*B60K 20/00* (2006.01)
*G05G 5/08* (2006.01)
*F16H 59/04* (2006.01)

(52) U.S. Cl. .................................. 74/473.24; 74/473.3

(58) Field of Classification Search .................. 74/473.1, 74/473.24, 473.25, 473.3, 473.33
See application file for complete search history.

(56) References Cited

U.S. PATENT DOCUMENTS

| 5,309,784 A * | 5/1994 | Kobayashi et al. ......... 74/473.33 |
| 6,848,331 B2 * | 2/2005 | Syamoto ..................... 74/473.23 |
| 2004/0045392 A1 * | 3/2004 | Wakayama ................. 74/473.33 |
| 2007/0137357 A1 * | 6/2007 | Tomida ........................ 74/473.1 |

FOREIGN PATENT DOCUMENTS

JP          2002-120582 A        4/2002

\* cited by examiner

*Primary Examiner* — Justin Krause
(74) *Attorney, Agent, or Firm* — Roberts Mlotkowski Safran & Cole P.C.

(57) ABSTRACT

In a shift lever device, when the shift lever is operated from a position C to a position N, a pusher slides along a select sliding region of an indexing section due to biasing force. In the indexing section, an anchor is formed at positions over the entire range of the select sliding region by a secondary resin penetrating completely into a through hole in a primary resin. Therefore, lifting of the secondary resin relative to the primary resin can be suppressed during molding of the secondary resin.

9 Claims, 10 Drawing Sheets

FIG. 7

LIFTING AMOUNT OF SECONDARY
RESIN RELATIVE TO PRIMARY RESIN (mm)

| | | | MAXIMUM WIDTH T OF THROUGH HOLE | | |
|---|---|---|---|---|---|
| | | | NO THROUGH HOLE | 2mm | 3mm |
| SHAPE OF THROUGH HOLE | ROUND HOLE | DATA 1 | 0.550 | 0.404 | 0.360 |
| | | DATA 2 | 0.510 | 0.400 | 0.358 |
| | ELONGATED HOLE | DATA 1 | 0.578 | 0.163 | 0.131 |
| | | DATA 2 | 0.595 | 0.206 | 0.128 |

FIG. 8

DEPTH OF INDENTED SECTION (SAG AMOUNT)
GENERATED IN SURFACE OF SECONDARY RESIN (mm)

| | | MAXIMUM WIDTH T OF THROUGH HOLE | | |
|---|---|---|---|---|
| | | NO THROUGH HOLE | 2mm | 3mm |
| SHAPE OF THROUGH HOLE | ROUND HOLE | 0.004 | 0.018 | 0.070 |
| | ELONGATED HOLE | 0.004 | 0.012 | 0.021 |

SHIFT LEVER DEVICE

CROSS-REFERENCE TO RELATED APPLICATION

This application claims priority under 35 USC 119 from Japanese Patent Application No. 2009-126601, filed May 26, 2009, the disclosure of which is incorporated by reference herein.

BACKGROUND

1. Technical Field

The present invention relates to a shift lever device in which a shift lever is operable in a select direction and a shift direction.

2. Related Art

As a shift lever device, there are shift lever devices in which an indexing face portion is provided on the bottom face of a top wall of a case, and an indexing pin is attached in a biased state to a shift lever (see, for example, Japanese Patent Application Laid-Open (JP-A) No. 2002-120582).

In such a shift lever device, biasing force is imparted to the shift lever by the indexing pin contacting the indexing face portion, and when operating the shift lever, the shift lever is operated against the biasing force, the indexing pin rides up over a ridge section on the indexing face portion, and imparts an indexing sensation to shift lever operation.

However, in such shift lever devices, when forming by two color molding by forming a soft resin on the external periphery of a hard resin top wall of the case, due to the thermal shrinkage ratio of the soft resin being greater than the thermal shrinkage ratio of the hard resin, when molding the soft resin, tensional stress acts along the surface direction in the soft resin during cooling. Consequently, the slope angle of the soft resin decreases, and there is the possibility of occurrences of the soft resin lifting, due to separation from the hard resin.

If lifting occurs of the soft resin from the hard resin at the portion configuring the indexing face section on the bottom face of the top wall of the case, there is a possibility of deforming movement of the soft resin towards the hard resin side due to biasing force imparted by the indexing pin when the shift lever is operated, when the indexing pin passes the portion where lifting has occurred on the indexing face portion. The biasing force imparted to the shift lever thereby decreases, and there is a possibility of the operation force (operation force against the biasing force) of the shift lever departing from the range of desired values.

SUMMARY

The present invention is made in consideration of the above circumstances and provides a shift lever device that can suppress the values of the operation force of the shift lever from departing from the desired range.

The shift lever device according to the present invention is includes: a shift lever operable in mutually intersecting select and shift directions, the shift lever moving from a reference position to a shift region when operated in a select direction, and the shift lever changing shift positions in the shift region when operated in the shift direction; a biasing member provided to one of the shift lever or a vehicle side; a contact member provided to the other of the shift lever or the vehicle side, and formed by molding an external peripheral material onto the external periphery of an internal material, biasing force being imparted to the shift lever by the biasing member contacting the contact member; and a pierced through section formed by the external peripheral material penetrating through a through hole piercing through the internal material, the pierced through section disposed over the entire range in which the contact member contacts the biasing member when the shift lever is operated in the select direction from the reference position to the shift region.

BRIEF DESCRIPTION OF THE DRAWINGS

Exemplary embodiments of the present invention will be described in detail based on the following figures, wherein:

FIG. 7 is a table showing the relationship of the lifting amount (maximum lifting amount) of the secondary resin relative to the primary resin, against the shape and maximum width of a through hole, in a shift lever device according to Test Examples of the present invention;

FIG. 8 is a table showing the relationship of depth of the indented section (maximum depth) generated in the surface (indexing face) of the secondary resin, against the shape and maximum width of a through hole, in a shift lever device according to Test Examples of the present invention;

DETAILED DESCRIPTION

Figure 3:
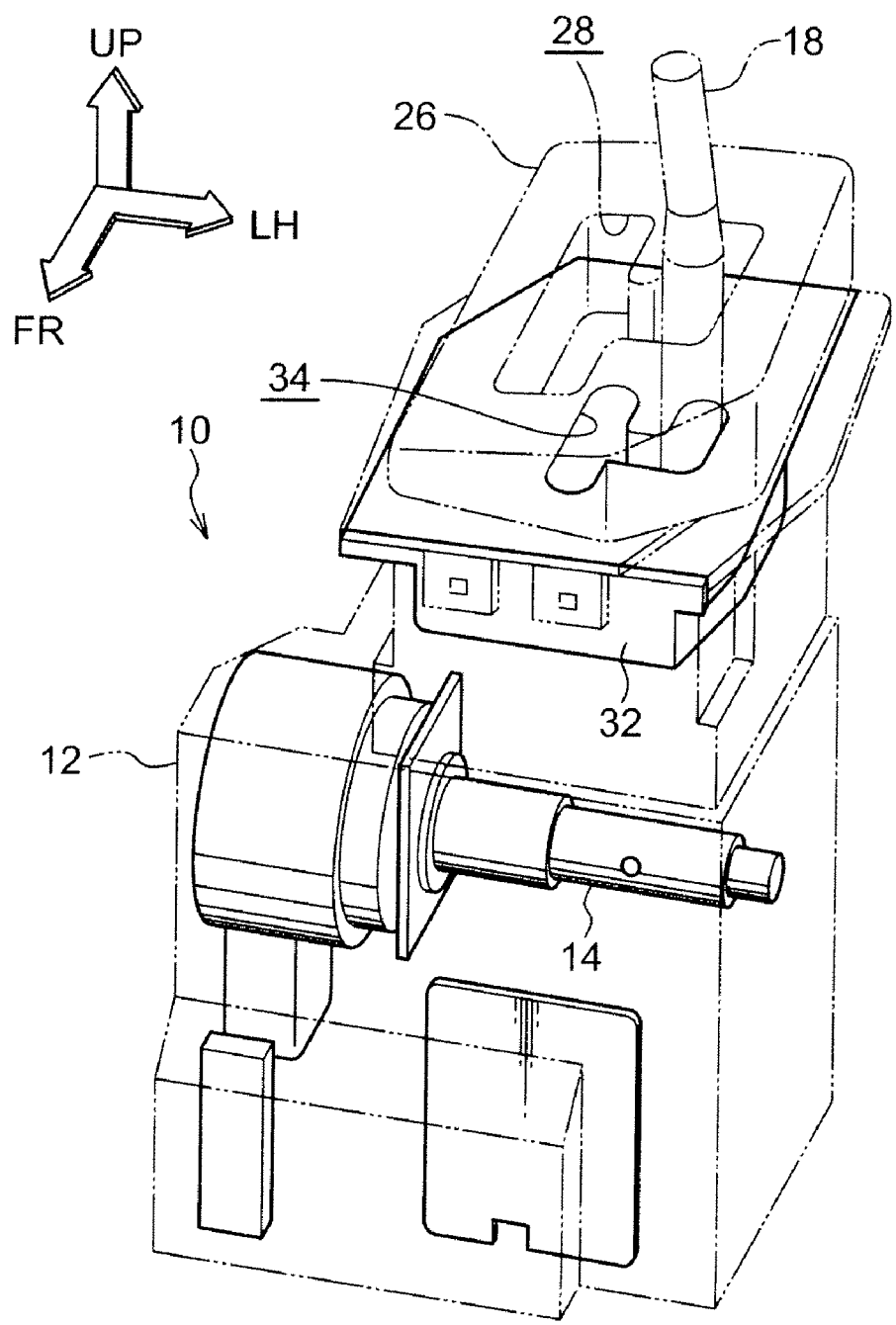
FIG. 3 is a perspective view of the interior of a shift lever device according to an exemplary embodiment of the present invention, as viewed diagonally from the vehicle front left.
Figure 4:
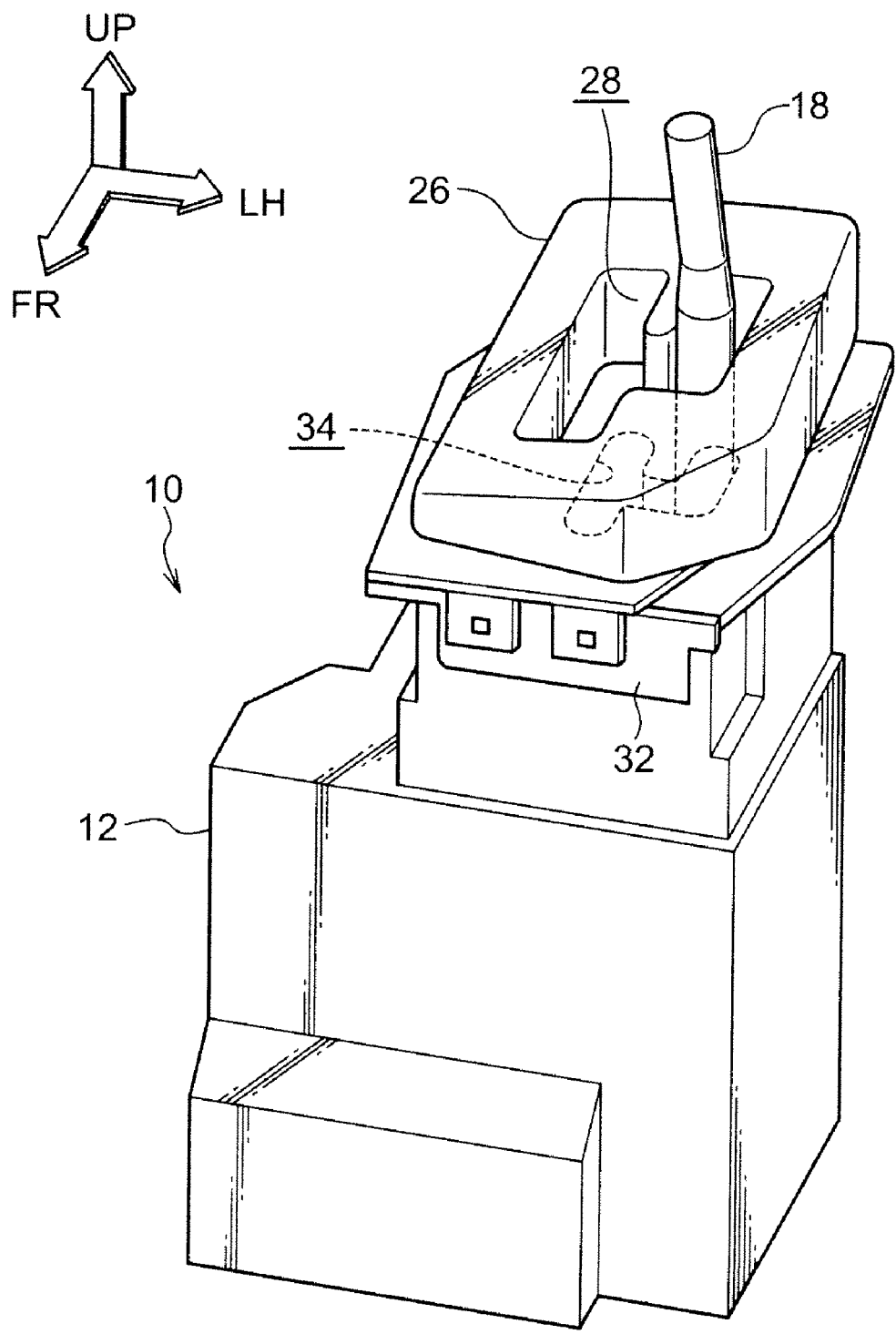
FIG. 4 is a perspective view of a shift lever device according to an exemplary embodiment of the present invention, as viewed diagonally from the vehicle front left.

FIG. 3 shows a perspective view of the interior of a shift lever device 10 according to the present exemplary embodiment, as viewed diagonally from the vehicle front left, and FIG. 4 shows a perspective view of the shift lever device 10, as viewed diagonally from the vehicle front left. In the drawings the vehicle front direction is shown by arrow FR, the vehicle left direction is shown by arrow LH, and the vehicle up direction by the arrow UP.

As shown in FIG. 3 and FIG. 4, the shift lever device 10 according to the present exemplary embodiment is attached to a floor section of a vehicle compartment in a vehicle.

The shift lever device 10 is equipped with a substantially rectangular box shaped housing 12, and the shift lever device 10 is attached to the floor section of the vehicle compartment by the housing 12 being fixed to the floor section of the vehicle compartment.

Figure 6:
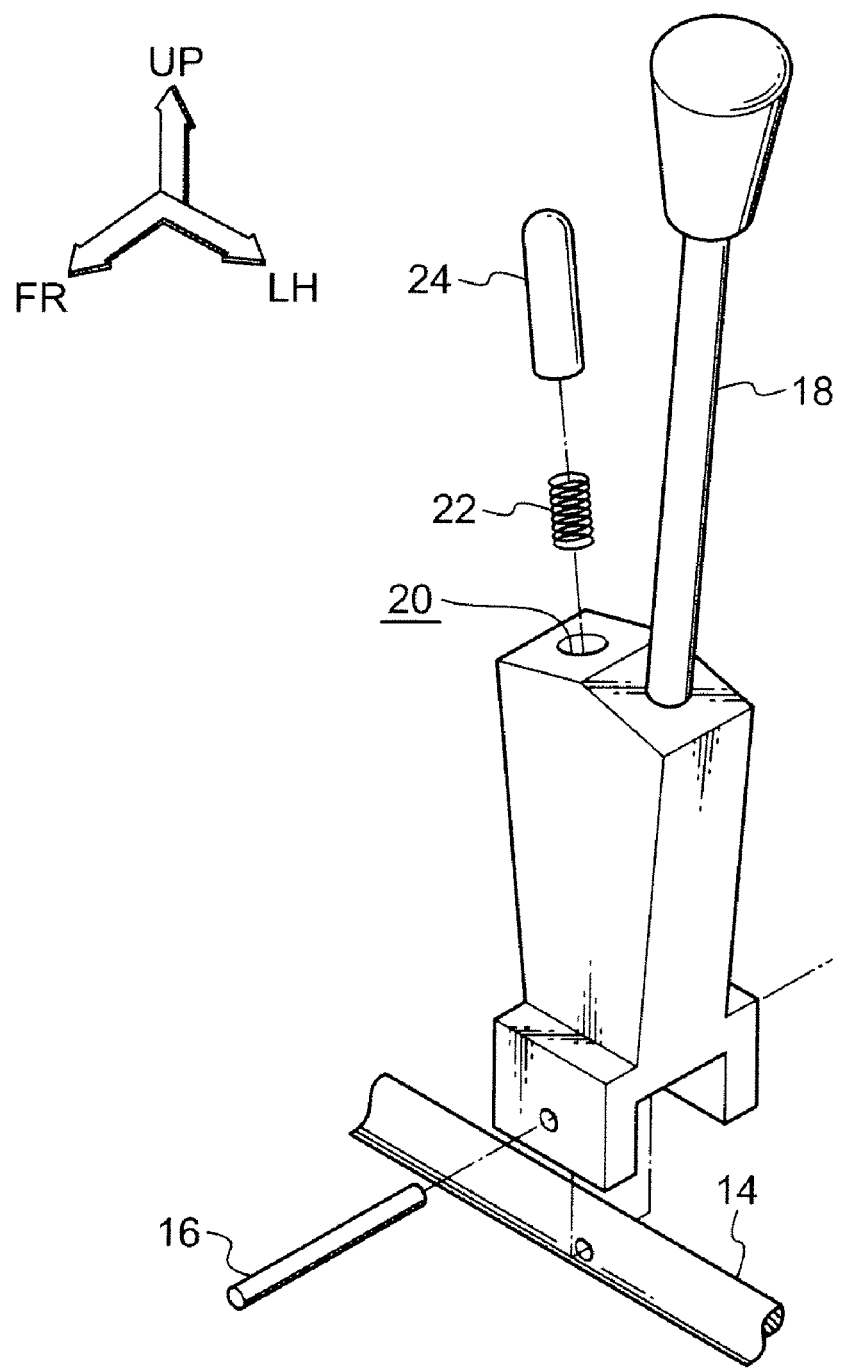
FIG. 6 is a perspective view of a shift lever of a shift lever device according to an exemplary embodiment of the present invention, as viewed diagonally from the vehicle front left.

As shown in FIG. 6, a substantially circular shaft shaped support shaft 14, serving as a support member, is supported, rotatable about its axis, within the housing 12. The support shaft 14 extends along the vehicle width direction. A substantially circular shaft shaped rotation shaft 16 is supported, rotatable about its axis, at an intermediate portion of the support shaft 14 in the axial direction. The rotation shaft 16 extends along the vehicle front-rear direction.

The bottom end of a substantially bar shaped shift lever 18 is attached to the rotation shaft 16, and the shift lever 18 is thereby supported by the support shaft 14, via the rotation shaft 16. The shift lever 18 is operable in a select direction (vehicle width direction) by being pivoted about the rotation shaft 16, and the shift lever 18 is operable in a shift direction (vehicle front-rear direction) by being pivoted together with the rotation shaft 16 about the support shaft 14.

A circular pillar shaped fit-insertion hole 20 is formed at a lower portion of the shift lever 18. The fit-insertion hole 20 opens at the top end. A compression coil spring 22 is inserted, as a biasing portion configuring a biasing member, into the fit-insertion hole 20, and the bottom end of the compression coil spring 22 makes contact with the bottom end face of the fit-insertion hole 20. A substantially circular pillar shaped pusher 24 (indexing pin), serving as a contact section configuring the biasing member, is inserted within the fit-insertion hole 20 above the compression coil spring 22, so as to be moveable therein. The top end of the pusher 24 is formed with a semi-spherical shape. The top end of the compression coil spring 22 makes contact with the bottom end of the pusher 24. The bottom end of the pusher 24 is biased upwards by the compression coil spring 22, and partially protrudes upwards from the top end opening of the fit-insertion hole 20.

As shown in FIG. 3 and FIG. 4, a cover 26 is fixed over the housing 12, and a shift hole 28 of a specific shape is formed as a through hole piercing through the cover 26. The shift lever 18 is inserted through the shift hole 28, and an upper portion of the shift lever 18 thereby extends above the housing 12.

Figure 5:
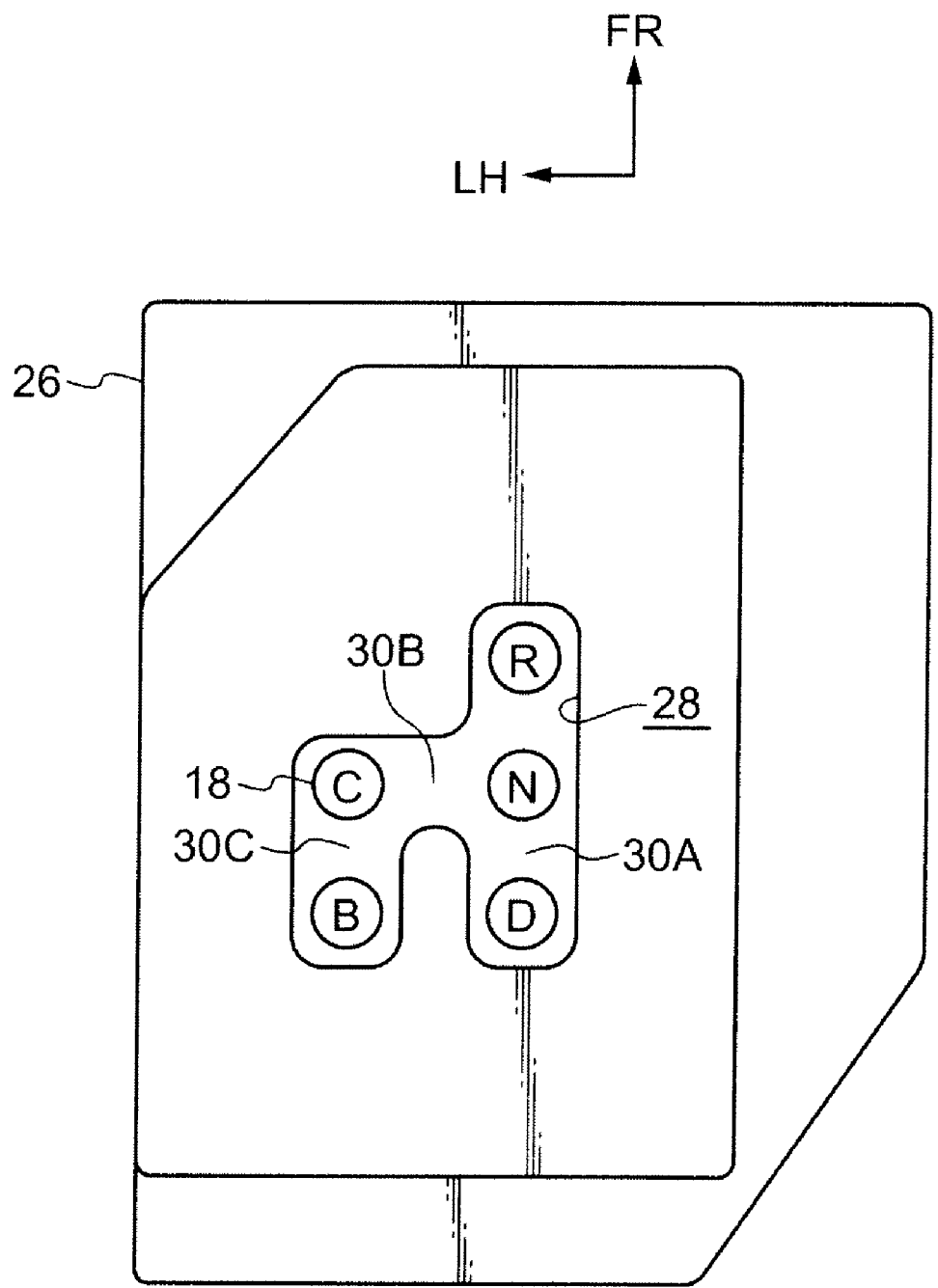
FIG. 5 is a plan view of a cover of a shift lever device according to an exemplary embodiment of the present invention, as viewed from above.

As shown in FIG. 5, a shift region 30A is provided at a first vehicle width direction end of the shift hole 28 (the vehicle right hand side in the present exemplary embodiment). The shift region 30A extends along the vehicle front-rear direction. A select region 30B is provided at the other (second) vehicle width direction end in the vehicle width direction (at the vehicle left hand side in the present exemplary embodiment) The select region 30B extends from a vehicle front-rear direction (length direction) central portion of the shift region 30A towards the second vehicle width direction end. A brake region 30C is provided at the second vehicle width direction end of the shift hole 28. The brake region 30C extends towards the vehicle rear direction from the second vehicle width direction end of the select region 30B.

The shift lever 18 is operable along the shift hole 28 in both the shift direction and the selection direction. The shift lever 18 is disposable in a position C (center position), as a reference position (a neutral position), at the second vehicle width direction end of the select region 30B. Furthermore, the shift lever 18 is operable to a position N (a neutral position), as a shift position at the center in the vehicle front-rear direction of the shift region 30A, a position R (reverse position), as a shift position at the vehicle front end of the shift region 30A, a position D (drive position), as a shift position at the vehicle rear end of the shift region 30A, and a position B (engine-brake position), as a shift position at the vehicle rear end of the brake region 30C.

As shown in FIG. 3 and FIG. 4, a lever guide 32 (gate structure) is fixed as a contact member (structural member) at an upper portion within the housing 12. The strength of the lever guide 32 is stronger than that of the cover 26. A guide hole 34 is formed, as a structural hole, passing through the lever guide 32, and the guide hole 34 is of a similar specific shape to that of the shift hole 28. The shift lever 18 is inserted through the guide hole 34 and the guide hole 34 guides operation of the above shift lever 18.

Figure 1:
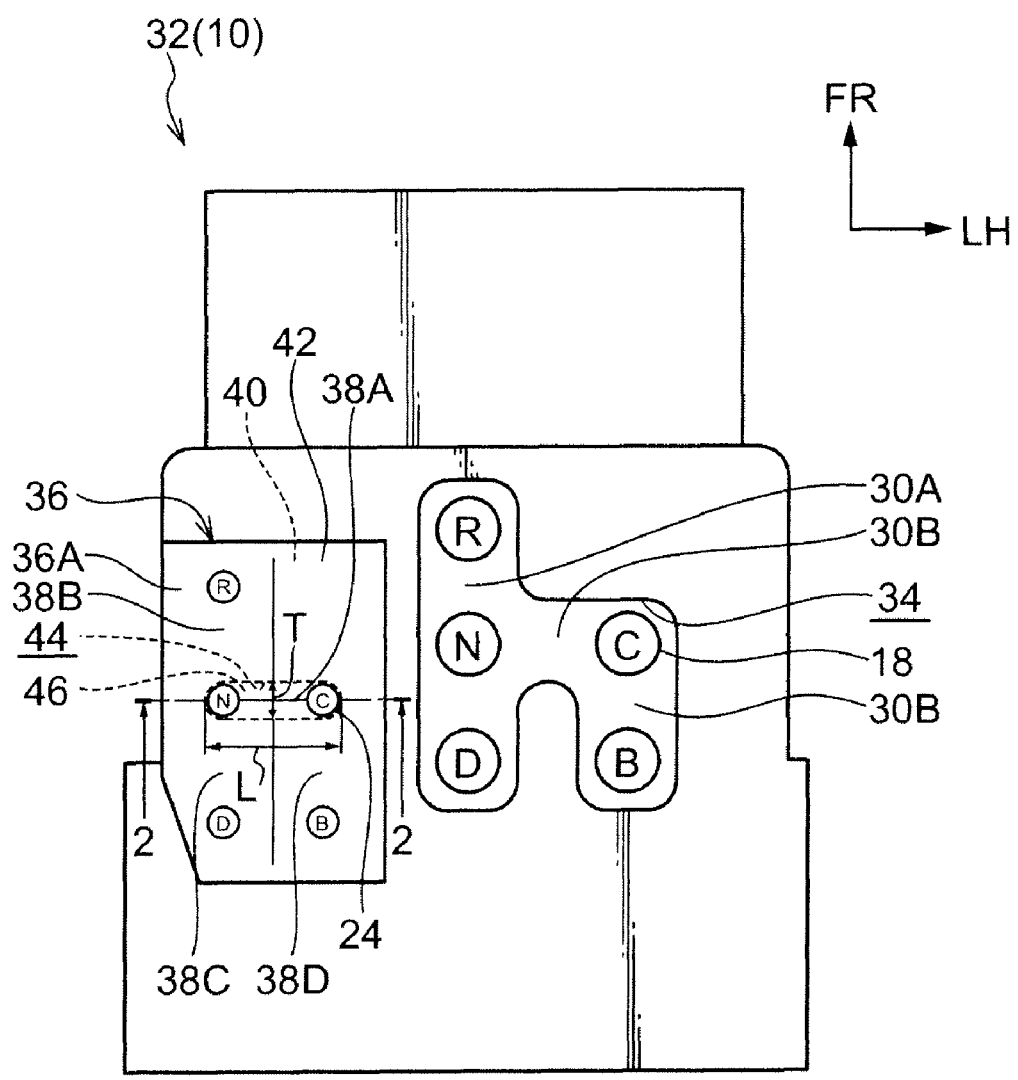
FIG. 1 is a view of the back face of a gate structure of a shift lever device according to an exemplary embodiment of the present invention, as seen from below.
Figure 2:
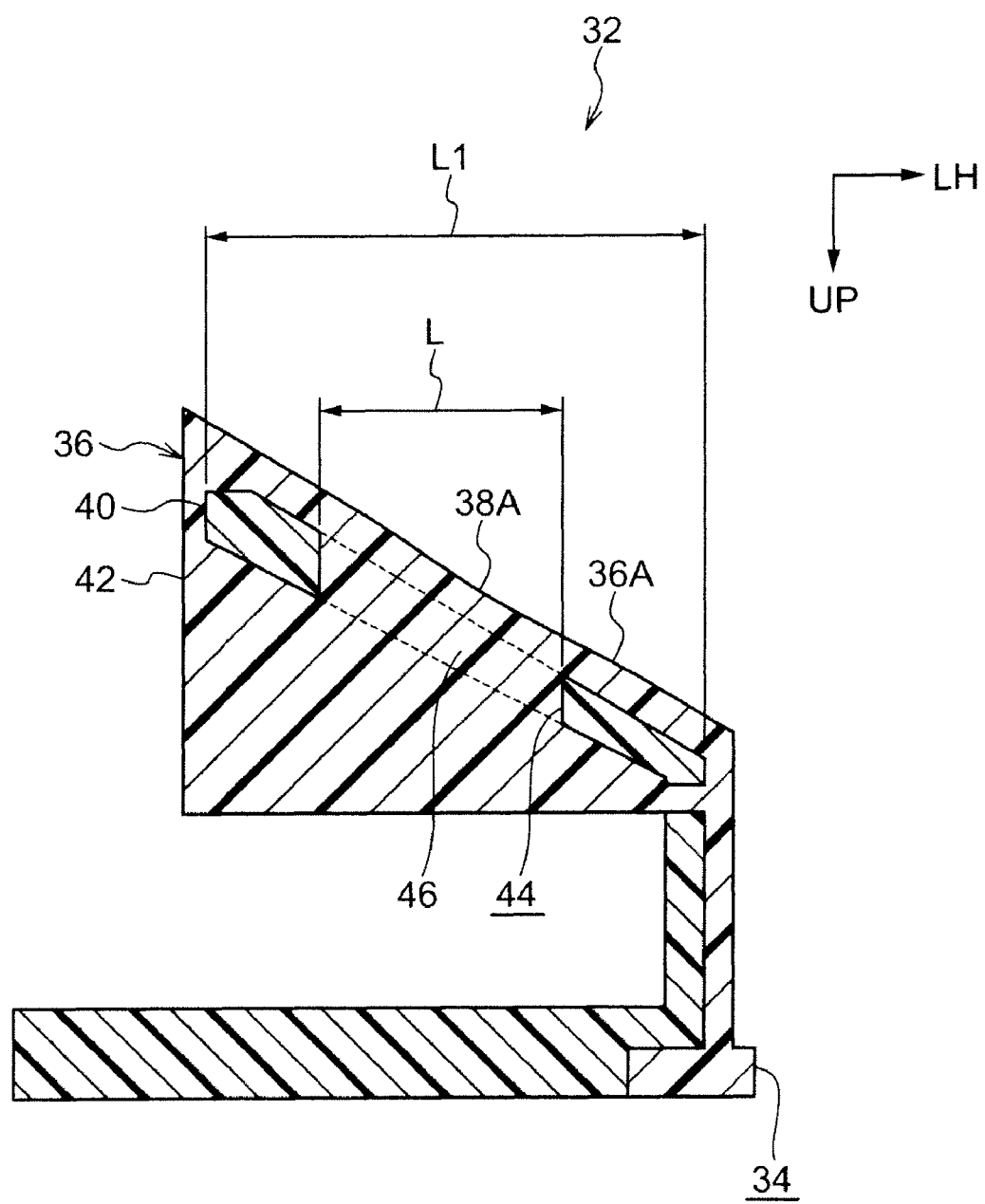
FIG. 2 is a cross-section (a cross-section taken on line 2-2 or FIG. 1) showing relevant portions of the gate structure of the shift lever device according to an exemplary embodiment of the present invention, as viewed from the vehicle front.

As shown in FIG. 1 and FIG. 2, an indexing section 36 is formed to the lever guide 32 at the side of the shift hole 28 (the vehicle right hand side in the present exemplary embodiment), and an indexing face 36A is formed as the bottom face of the indexing section 36. The top end of the above pusher 24 makes contact with the indexing face 36A due to biasing force of the compression coil spring 22, and the biasing force of the compression coil spring 22 is thereby imparted to the shift lever 18.

When operating the shift lever 18, the shift lever 18 moves integrally with the pusher 24, and the top end of the pusher 24 slides along the indexing face 36A of the lever guide 32 due to the biasing force of the compression coil spring 22.

When the shift lever 18 is disposed in the position C, the position N, the position R, the position D, or the position B, the top end of the pusher 24 makes contact respectively with a contact position C, a contact position N, a contact position R, a contact position D, or a contact position B of the indexing face 36A. When the shift lever 18 is operated from the position C to the position N, the top end of the pusher 24 slides along a select sliding region 38A of the indexing face 36A (a region from the contact position C to the contact position N, including the contact position C and the contact position N). When the shift lever 18 is operated from the position N to the position R, the top end of the pusher 24 slides along an R sliding region 38B of the indexing face 36A (a region from the contact position N to the contact position R, including the contact position N and the contact position R). When the shift lever 18 is operated from the position N to the position D, the top end of the pusher 24 slides along a D sliding region 38C of the indexing face 36A (a region from the contact position N to the contact position D, not including the contact position N but including the contact position D). When the shift lever 18 is operated from the position C to the position B, the top end of the pusher 24 slides along a B sliding region 38D of the indexing face 36A (a region from the contact position C to the contact position B, not including the contact position C but including the contact position B).

The select sliding region 38A of the indexing face 36A slopes in a downwards direction on progression from the contact position C to the contact position N. The R sliding region 38B of the indexing face 36A slopes (with a curving indented shape) in a downwards direction on progression from the contact position N towards the contact position R. The D sliding region 38C of the indexing face 36A slopes (with a curving indented shape) in a downwards direction on progression from the contact position N towards the contact position D. The B sliding region 38D of the indexing face 36A slopes (with a curving indented shape) in a downwards direction on progression from the contact position C towards the contact position B.

Consequently, the pusher 24 is moved downwards on progression of the shift lever 18 away from the position C to a position separated therefrom, due to the sloping of the indexing face 36A, and biasing force of the compression coil spring 22 imparted to the pusher 24 increases. Therefore, when the shift lever 18 is not being operated, the shift lever 18 is disposed in the position C due to the biasing force of the compression coil spring 22 and the sloping of the indexing face 36A. When the shift lever 18 is operated away from the position C, the shift lever 18 is operated against the biasing force of the compression coil spring 22.

The lever guide 32 (including the indexing section 36) is formed by two-color molding of a primary resin 40 (PA-GF), as an internal material and a secondary resin 42 (HYTREL) as an external peripheral material. The indexing section 36 is formed with the secondary resin 42 molded as a covering over the entire external periphery of the rectangular plate shaped primary resin 40. The secondary resin 42 is a material that is relatively soft, and has a relatively large thermal shrinkage ratio, in comparison to the primary resin 40. Therefore, when the secondary resin 42 is molded over the external periphery of the primary resin 40, tensional stress is generated along the surface direction of the secondary resin 42 during cooling of the secondary resin 42.

The primary resin 40 of the indexing section 36 is formed with an elongated pillar shaped through hole 44 (long hole) at positions over the entire range of the select sliding region 38A of the indexing face 36A. The length direction of the through hole 44 is disposed along the length direction of the select sliding region 38A. When the secondary resin 42 is being formed over the entire external periphery of the primary resin 40, the secondary resin 42 penetrates completely into the through hole 44, forming the elongated pillar shaped anchor 46, as a pierced through section. The anchor 46 is thereby connects to the secondary resin 42 on the topside and the bottom side of the primary resin 40.

The through hole 44 and the anchor 46 are formed with length direction central portions thereof that are rectangular pillar shaped, and with both length direction end portions thereof that are semi-circular pillar shaped. The maximum width T, and the maximum longitudinal direction length L of the through hole 44 and the anchor 46 (see FIG. 1), are respectively slightly bigger than the select sliding region 38A of the indexing face 36A. For example, the maximum width T of the through hole 44 and the anchor 46 is 2 mm, the maximum longitudinal direction length L of the through hole 44 and the anchor 46 is 9 mm Explanation follows of the operation of the present exemplary embodiment.

In the shift lever device 10 of the above configuration, the top end of the pusher 24, moving integrally with the shift lever 18, makes contact with the indexing face 36A of the lever guide 32 (indexing section 36) due to the biasing force of the compression coil spring 22. When the shift lever 18 is not being operated, the shift lever 18 is disposed in the position C of the select region 30B due to the biasing force of the compression coil spring 22 and the sloping of the indexing face 36A. Due thereto, when the shift lever 18 is operated away from the position C, the shift lever 18 is operated against the biasing force of the compression coil spring 22.

When the shift lever 18 is moved from the position C in the shift region 30A in the selection direction, the shift position is then changeable within the shift region 30A to the position N, position R or the position D, by operation of the shift lever 18 in the shift direction. Furthermore, the shift position is changeable to the position B by moving the shift lever 18 from the position C in the shift direction in the brake region 30C.

When the shift lever 18 is operated from the position C to the position N, the top end of the pusher 24 slides along the select sliding region 38A of the indexing face 36A. When the shift lever 18 is being operated from the position N to the position R, the top end of the pusher 24 slides along the R sliding region 38B of the indexing face 36A. When the shift lever 18 is being operated from the position N to the position D, the top end of the pusher 24 slides along the D sliding region 38C of the indexing face 36A. When the shift lever 18 is being operated from the position C to the position B, the top end of the pusher 24 slides along the B sliding region 38D of the indexing face 36A.

However, the indexing section 36 of the lever guide 32 is formed with the secondary resin 42 molded to cover the entire external periphery of the primary resin 40. When the secondary resin 42 is being molded over the entire external periphery of the primary resin 40, tensional force is generated along the surface direction of the secondary resin 42 during cooling of the secondary resin 42.

At the positions on the indexing section 36 of the entire range of the select sliding region 38A of the indexing face 36A, the secondary resin 42 penetrates entirely into the through hole 44 of the primary resin 40, and the anchor 46 is formed. The anchor 46 connects the secondary resin 42 at the topside and the bottom side of the primary resin 40. Therefore, even when, during molding the secondary resin 42, tensional stress is generate along the surface direction of the secondary resin 42 during cooling, occurrences of the secondary resin 42 lifting off, due to separation of the secondary resin 42 relative to the primary resin 40, can be prevented at positions over the entire range of the select sliding region 38A.

Consequently, when the shift lever 18 is operated in the select direction from the position C to the position N and the top end of the pusher 24 slides along the select sliding region 38A of the indexing face 36A, the secondary resin 42 can be prevented from deforming movement to the primary resin 40 side due to the biasing force of the compression coil spring 22. Consequently, when the shift lever 18 is being operated in the selection direction from the position C to the position N, the biasing force of the compression coil spring 22 imparted to the shift lever 18 can be suppressed from decreasing. Furthermore, operation force of the shift lever 18 (operation force against the biasing force of the compression coil spring 22) can be suppressed from departing from the range of desired values.

Furthermore, the maximum width T and the maximum longitudinal direction length L of the anchor 46 are each, respectively, made slightly greater than the select sliding region 38A of the indexing face 36A, and the maximum width T of the anchor 46 is made sufficiently shorter than the maximum longitudinal direction length L of the anchor 46. Therefore, the anchor 46 molded section of the secondary resin 42, namely, the thickened portion of the secondary resin 42, can be made smaller, and when molding the secondary resin 42, generation of an indentation (a so-called sag portion) in the surface of the secondary resin 42 (indexing face 36A) during cooling can be suppressed. Due thereto, when the shift lever 18 is being operated in the select direction from the position C to the position N, the biasing force of the compression coil spring 22 imparted to the shift lever 18 can be suppressed form reducing due to such an indentation. The operation force of the shift lever 18 can also be suppressed from departing from the desired range of values.

Furthermore, since the shift lever 18 is disposed in the position C when the shift lever 18 is not being operated, the shift lever 18 needs to be moved from the position C in the select direction, and moved along the shift region 30A in order to operate the shift lever 18 to the position N, position R, or position D in the shift region 30A. Therefore, in the frequent operation of the shift lever 18 being operated in the select direction from the position C to the position N, the operation force of the shift lever 18 can be suppressed from departing from the desired range of values.

Furthermore, since the anchor 46 is formed in the indexing section 36, occurrences of lifting due to the secondary resin 42 separating relative to the primary resin 40 can also be suppressed in all regions outside the select sliding region 38A of the indexing face 36A.

Consequently, when the shift lever 18 is operated in the shift region 30A in the shift direction and the top end of the pusher 24 slides along the R sliding region 38B and the D sliding region 38C of the indexing face 36A, and also when the shift lever 18 is operated in the brake region 30C in the shift direction and the top end of the pusher 24 slides along the B sliding region 38D of the indexing face 36A, the secondary resin 42 can be suppressed from deforming movement to the primary resin 40 side due to the biasing force of the compression coil spring 22. Therefore, when the shift lever 18 is operated in the shift direction in both the shift region 30A and the brake region 30C, the biasing force imparted to the shift lever 18 can be suppressed from decreasing, and the operation force of the shift lever 18 can be suppressed from departing from the desired range of values.

Note that in the present exemplary embodiment, configuration is made with the fit-insertion hole 20, the compression coil spring 22 and the pusher 24 provided to the shift lever 18, and with the indexing section 36 provided to the lever guide 32, however, configuration may be made with the indexing section 36 provided to the shift lever 18, and the fit-insertion hole 20, compression coil spring 22 and pusher 24 provided to the lever guide 32 (on the vehicle side).

Furthermore, in the present exemplary embodiment, the shift lever 18 is configured operable in the select region 30B, the shift region 30A and the brake region 30C, however configuration may be made in which the shift lever 18 is only operable in the select region 30B and the shift region 30A, or configuration may be made in which the shift lever 18 is also operable in a region other than the select region 30B, the shift region 30A, and the brake region 30C.

Furthermore, in the present exemplary embodiment, configuration is made with the shift lever device 10 provided to a floor section of a vehicle, however, configuration may be made with the shift lever device 10 provided to another portion of a vehicle (for example, to an instrument panel or to a steering column).

TEST EXAMPLES

In the present Test Examples, in cases where the through hole 44 is formed as a round hole through the primary resin 40 of the lever guide 32 (the indexing section 36), the through hole 44 is disposed at a length direction central position of the select sliding region 38A. Furthermore, in FIG. 7 to FIG. 12, when the through hole 44 is formed as an elongated hole, the maximum longitudinal direction length L of the through hole 44 is 9 mm. The cooling duration when molding the secondary resin 42 is 60 seconds.

FIG. 7 shows a table of the relationship between the shape and maximum width T of the through hole 44 and the lifting amount of the secondary resin 42 relative to the primary resin 40.

As shown in FIG. 7, when the through hole 44 is formed through the primary resin 40, the lifting amount of the secondary resin 42 relative to the primary resin 40 is reduced compared to when the through hole 44 is not formed through the primary resin 40. Furthermore, when the through hole 44 is an elongated hole, the lifting amount of the secondary resin 42 relative to the primary resin 40 is reduced compared to when the through hole 44 is a round hole. However, when the maximum width T of the through hole 44 is 3 mm, the lifting amount of the secondary resin 42 relative to the primary resin 40 is reduced compared to when the maximum width T of the through hole 44 is 2 mm.

FIG. 8 shows a table of the relationship between the shape and maximum width T of the through hole 44 and the depth (sag amount) of the indented section generated in the surface of the secondary resin 42 (indexing face 36A).

As shown in FIG. 8, when the through hole 44 is formed through the primary resin 40, the depth of the indented section generated in the surface of the secondary resin 42 is deeper than when the through hole 44 is not formed in the primary resin 40. Furthermore, when the through hole 44 is formed as an elongated hole, the depth of the indented section generated in the surface of the secondary resin 42 is shallower than when the through hole 44 is formed as a round hole. However, when the maximum width T of the through hole 44 is 2 mm, the depth of the indented section generated in the surface of the secondary resin 42 is shallower in comparison to when the maximum width T of the through hole 44 is 3 mm.

Figure 9:
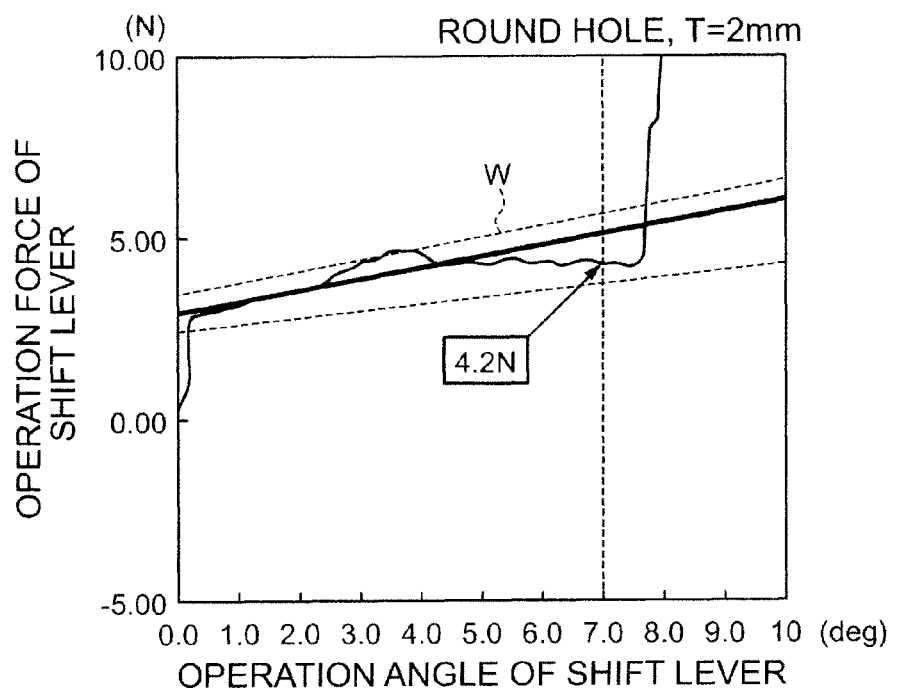
FIG. 9 is a graph of the relationship between the operation angle of a shift lever, when operating the shift lever in the select direction from a position C to a position N, and the operation force of the shift lever, when a through hole in the shift lever device according to a Test Example of the present invention is a round hole of maximum width (diameter) 2 mm.
Figure 10:
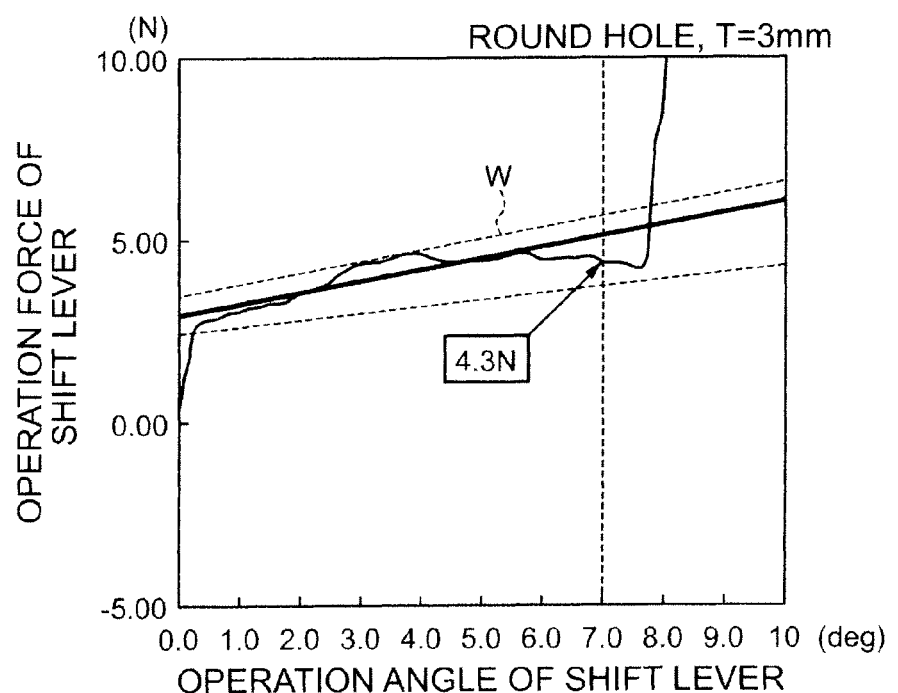
FIG. 10 is a graph of the relationship between the operation angle of a shift lever, when operating the shift lever in the select direction from a position C to a position N, and the operation force of the shift lever, when a through hole in the shift lever device according to a Test Example of the present invention is a round hole of maximum width (diameter) 3 mm.
Figure 11:
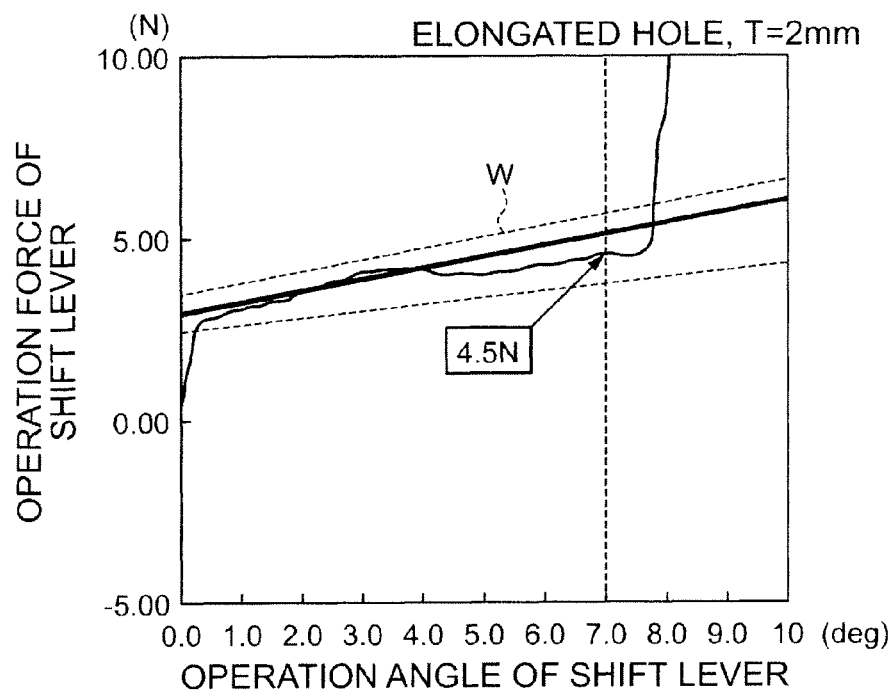
FIG. 11 is a graph of the relationship between the operation angle of a shift lever, when operating the shift lever in the select direction from a position C to a position N, and the operation force of the shift lever, when a through hole in the shift lever device according to a Test Example of the present invention is an elongated hole of maximum width 2 mm.
Figure 12:
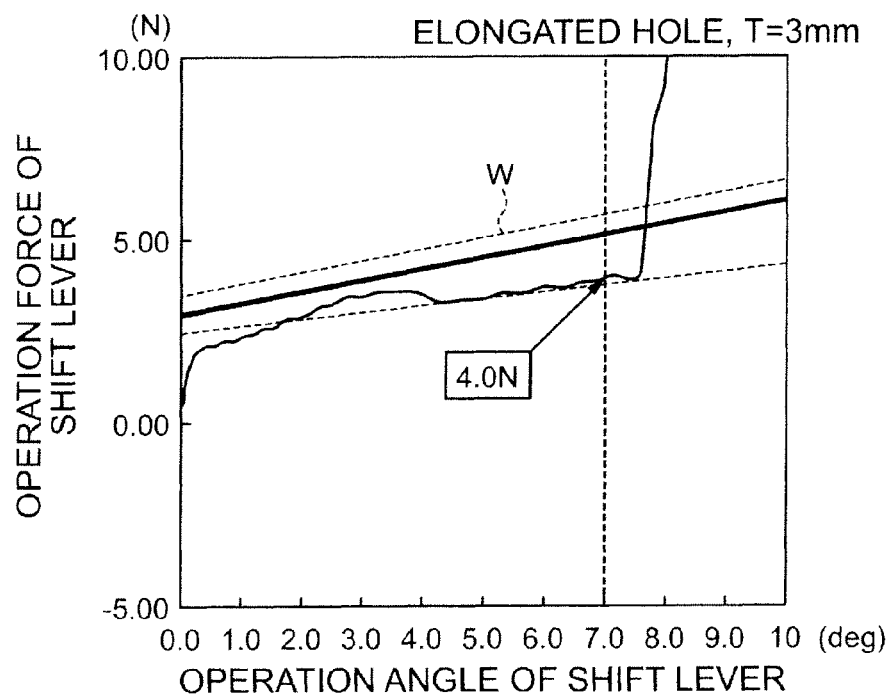
FIG. 12 is a graph of the relationship between the operation angle of a shift lever, when operating the shift lever in the select direction from a position C to a position N, and the operation force of the shift lever, when a through hole in the shift lever device according to a Test Example of the present invention is an elongated hole of maximum width of 3 mm.

FIG. 9 to FIG. 12 show graphs of the relationship between the operation angle of the shift lever 18 and the operation force of the shift lever 18 when operating the shift lever 18 in the select direction from the position C to the position N. FIG. 9 shows a case where the through hole 44 is a round hole of maximum width T (diameter) 2 mm, FIG. 10 shows a case where the through hole 44 is a round hole of maximum width T (diameter) 3 mm, FIG. 11 shows a case where the through hole 44 is an elongated hole of maximum width T 2 mm (a case of the above exemplary embodiment), and FIG. 12 shows a case where the through hole 44 is an elongated hole of maximum width T of 3 mm.

As shown in FIG. 9 to FIG. 12, the values of the operation force of the shift lever 18 can be suppressed from departing from the desired range W when the shift lever 18 is operated in the select direction from the position C to the position N in all of the cases of FIG. 9 to FIG. 12. As shown in FIG. 11, when the through hole 44 is formed as an elongated hole of maximum width T 2 mm, the values of the operation force of the shift lever 18 can be particularly appropriately suppressed from departing from the desired range W when the shift lever 18 is operated in the select direction from the position C to the position N.

Figure 13:
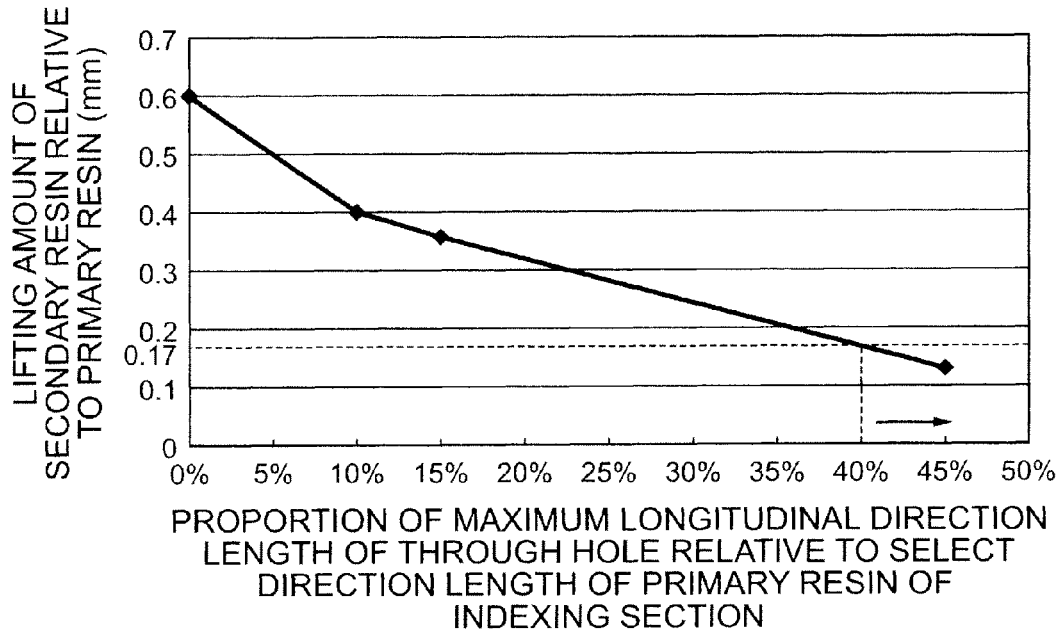
FIG. 13 is a graph showing, in a shift lever device according to Test Examples of the present invention, the relationship between the proportion of the maximum longitudinal direction length of the through hole relative to the select direction length (length through the width direction center of the through hole) of the primary resin of the indexing section against the lifting amount (maximum lifting amount) of the secondary resin relative to the primary resin.

FIG. 13 shows a graph of the relationship between the proportion of the maximum longitudinal direction length L of the through hole 44 to the select direction length L1 (vehicle width direction) of the primary resin 40 of the indexing section 36 (see FIG. 2), against the lifting amount of the secondary resin 42 relative to the primary resin 40.

In order to suppress the values of the operation force of the shift lever 18 from departing from the desired range when the shift lever 18 is operated in the select direction from the position C to the position N, the lifting amount of the secondary resin 42 relative to the primary resin 40 is preferably 0.17 mm or less. Therefore, as shown in FIG. 13, the proportion of the maximum longitudinal direction length L of the through hole 44 to the select direction length L1 is preferably 40% or above.

Figure 14:
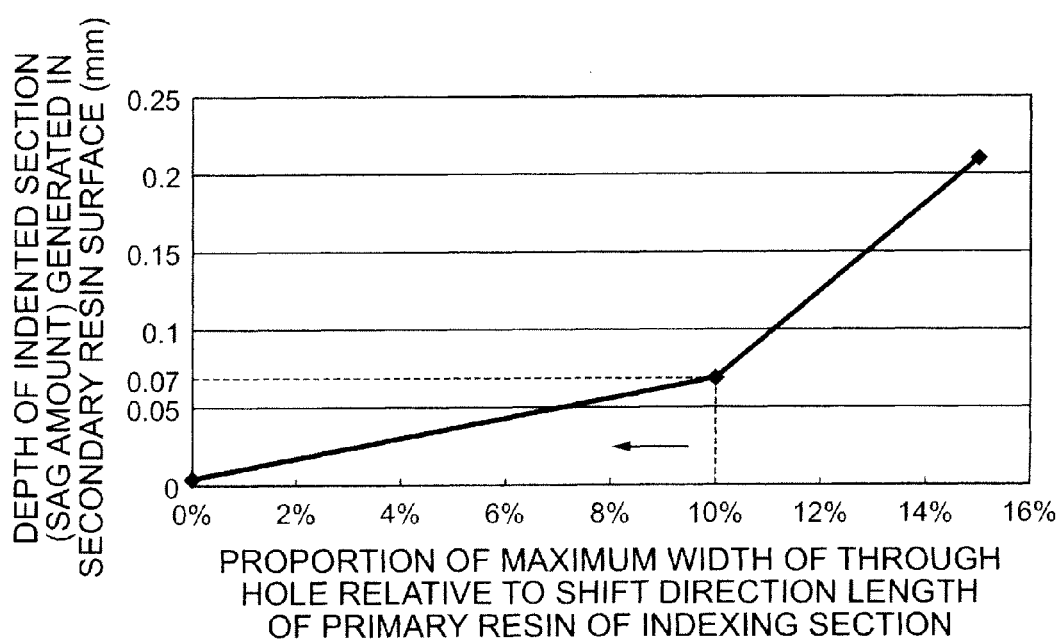
FIG. 14 is a graph showing, in a shift lever device according to Test Examples of the present invention, the relationship between the proportion of the maximum width of the through hole relative to the shift direction length (length through the longitudinal direction center of the through hole) of the primary resin of the indexing section against the depth of the indented section (maximum depth) generated in the surface (indexing face) of the secondary resin.

FIG. 14 shows a graph of the relationship between the proportion of the maximum width T of the through hole 44 relative to the shift direction (vehicle front-rear direction) length of the primary resin 40 of the indexing section 36, against the depth of the indented section (sag amount) generated in the surface of the secondary resin 42 (indexing face 36A).

In order to suppress the values of the operation force of the shift lever 18 from departing from the desired range when the shift lever 18 is operated in the select direction from the position C to the position N, the depth of the indented section generated in the surface of the secondary resin 42 is preferably 0.07 mm or less. Therefore, as shown in FIG. 14, the proportion of the maximum width T of the through hole 44 to the shift direction length of the primary resin 40 of the indexing section 36 is preferably 10% or less.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A shift lever device comprising:
    a shift lever operable in mutually intersecting select and shift directions, the shift lever moving from a reference position to a shift region when operated in a select direction, and the shift lever changing shift positions in the shift region when operated in the shift direction;
    a biasing member provided to one of the shift lever or a vehicle side; and
    a contact member provided to the other of the shift lever or the vehicle side, and biasing force being imparted to the shift lever by the biasing member contacting the contact member; the contact member comprising a first member having a through hole and formed by an internal material and a second member directly contacting the external periphery of the first member formed by an external peripheral material which is different from the internal material, and
    a pierced through section formed at the second member penetrating through a through hole and disposed over the entire range in which the contact member contacts the biasing member when the shift lever is operated in the select direction from the reference position to the shift region.

2. The shift lever of claim 1, wherein the length of the pierced through section in a direction perpendicular to the select direction is determined shorter than the length of the pierced through section in the select direction.

3. The shift lever of claim 2, wherein the shift lever is biased from the shift region towards the reference position.

4. The shift lever of claim 1, wherein the shift lever is biased from the shift region towards the reference position.

5. The shift lever of claim 1, wherein the through hole is formed with an elongated shape with the length direction of the through hole disposed along the selection direction.

6. The shift lever of claim 5, wherein the through hole is elongated along a length direction, and both length direction end portions of the through hole are of a semi-circular shape.

7. The shift lever of claim 1, wherein the internal material and the external peripheral material are formed from a primary resin and a secondary resin, respectively, with the secondary resin being a material that is softer and has a larger thermal shrinkage ratio than the primary resin.

8. The shift lever of claim 1, wherein the biasing member comprises a contacting pusher that contacts the contact member, and a compression coil spring that biases the pusher against the contact member.

9. The shift lever of claim 8, wherein an end of the pusher that contacts the contact member is of a semi-spherical shape.

* * * * *